US011633763B2

(12) United States Patent
Kress et al.

(10) Patent No.: US 11,633,763 B2
(45) Date of Patent: Apr. 25, 2023

(54) SEQUENTIAL IMAGING FOR CONTAINER SIDEWALL INSPECTION (71) Applicant: Applied Vision Corporation, Cuyahoga Falls, OH (US)

(72) Inventors: Michael Leo Kress, Uniontown, OH (US); Richard A. Sones, Cleveland Heights, OH (US)

(73) Assignee: APPLIED VISION CORPORATION, Cuyahoga Falls, OH (US)

(*) Notice: Subject to any disclaimer, the term of this patent is extended or adjusted under 35 U.S.C. 154(b) by 151 days.

(21) Appl. No.: 16/716,422

(22) Filed: Dec. 16, 2019

(65) Prior Publication Data
US 2021/0178431 A1 Jun. 17, 2021

(51) Int. Cl.
*G06T 7/00* (2017.01)
*B07C 5/34* (2006.01)
*G01N 21/90* (2006.01)
*B07C 5/342* (2006.01)

(52) U.S. Cl.
CPC ....... *B07C 5/3408* (2013.01); *G01N 21/9036* (2013.01); *G06T 7/0004* (2013.01); *B07C 5/342* (2013.01)

(58) Field of Classification Search
CPC .. B07C 5/3408; B07C 5/342; G01N 21/9036; G06T 7/0004; G06T 2207/10016; G06T 2207/30164; G06T 7/001
See application file for complete search history.

(56) References Cited

U.S. PATENT DOCUMENTS

| 3,932,042 A * | 1/1976 | Faani ............... B07C 5/126 356/239.4 |
| 5,969,810 A | 10/1999 | Nicks et al. |
| 6,031,221 A | 2/2000 | Furnas |
| 6,452,156 B2 | 9/2002 | Lindner |
| 6,618,495 B1 | 9/2003 | Furnas |
| 7,626,158 B2 | 12/2009 | Diehr et al. |
| 10,812,727 B1 * | 10/2020 | Kempf ............... G06K 7/10831 |
| 2001/0054680 A1 * | 12/2001 | Lindner ............. G01N 21/9036 250/223 B |
| 2003/0035103 A1 | 2/2003 | Werzinger et al. |

(Continued)

FOREIGN PATENT DOCUMENTS

WO 2021126717 A1 6/2021

OTHER PUBLICATIONS

"International Search Report and Written Opinion of the International Searching Authority for PCT Patent Application No. PCT/US2020/064696", dated Mar. 15, 2021, 17 Pages.

*Primary Examiner* — Solomon G Bezuayehu
(74) *Attorney, Agent, or Firm* — Calfee, Halter & Griswold LLP (57) ABSTRACT

A container inspection system is described herein. The container inspection system includes a camera and a computing system, wherein the camera is configured to capture multiple images of a transparent container as the transparent container is transported along a conveyor. Thus, the camera captures several images of the transparent container when the transparent container is at different positions relative to the camera. The container inspection system detects a defect in the transparent container based upon one or more images in the several images.

20 Claims, 7 Drawing Sheets

(56) References Cited

U.S. PATENT DOCUMENTS

| | | | |
|---|---|---|---|
| 2003/0146285 A1* | 8/2003 | Moore | G06K 7/10861 |
| | | | 235/462.48 |
| 2008/0094617 A1 | 4/2008 | Diehr | |
| 2008/0094618 A1 | 4/2008 | Sones et al. | |
| 2010/0166253 A1* | 7/2010 | Moore | G06V 10/267 |
| | | | 382/100 |
| 2011/0157577 A1* | 6/2011 | Dohse | G03F 9/00 |
| | | | 355/72 |
| 2011/0248083 A1* | 10/2011 | Bonner | G06F 16/00 |
| | | | 235/375 |
| 2012/0224666 A1* | 9/2012 | Speller | G01T 1/1603 |
| | | | 378/8 |
| 2014/0096863 A1 | 4/2014 | Herrmann et al. | |
| 2015/0177157 A1* | 6/2015 | Edmondson | G06T 7/0004 |
| | | | 348/125 |
| 2015/0241457 A1* | 8/2015 | Miller | G01N 21/84 |
| | | | 382/103 |
| 2016/0109380 A1 | 4/2016 | Huibregtse et al. | |
| 2016/0321796 A1* | 11/2016 | Dordoni | G01M 11/081 |
| 2016/0371568 A1* | 12/2016 | Tin | G06N 7/005 |
| 2017/0097305 A1 | 4/2017 | Prinz | |
| 2017/0154417 A1 | 6/2017 | Niedermeier | |
| 2018/0018519 A1* | 1/2018 | O'Brien | G06F 40/117 |
| 2018/0143214 A1* | 5/2018 | Bueren | G01N 35/00603 |
| 2018/0144455 A1* | 5/2018 | Van Schelven | G06T 7/001 |
| 2019/0011252 A1* | 1/2019 | Moeller | B05C 21/00 |
| 2019/0101885 A1* | 4/2019 | Oya | G05B 19/058 |
| 2019/0145904 A1 | 5/2019 | Lopez | |
| 2019/0257692 A1* | 8/2019 | Cochran | G06T 7/73 |
| 2019/0392602 A1* | 12/2019 | Lloyd | G06T 7/73 |
| 2020/0208966 A1* | 7/2020 | Pérez Cortés | B07C 5/366 |
| 2021/0048395 A1* | 2/2021 | Will | H04N 7/188 |
| 2021/0116387 A1* | 4/2021 | Hewicker | H04N 5/2256 |
| 2021/0124994 A1* | 4/2021 | Bui | G06K 9/00201 |
| 2021/0125373 A1* | 4/2021 | Gauthier | G06T 7/13 |
| 2021/0326603 A1* | 10/2021 | Kempf | G05D 1/0094 |
| 2022/0007589 A1* | 1/2022 | Binney | G06T 7/0012 |
| 2022/0327798 A1* | 10/2022 | Müller | G01S 7/4865 |

* cited by examiner

SEQUENTIAL IMAGING FOR CONTAINER SIDEWALL INSPECTION

BACKGROUND

During a manufacturing process for a transparent container, such as a beverage container, a defect may develop in a sidewall of the container that renders the container undesirable for consumer use. Defects can include a crack, stone, blister, saddle wave, stray filament of glass, amongst others, at various locations about the container. Conventionally, when a container is identified as having a defect it is removed from a filling line so that the defective container does not get filled with liquid and shipped to a downstream consumer. Fairly recently, detection of a defect in a sidewall of a transparent (glass) container has been undertaken by manual inspection; a human manually reviews the container, turns the container in his or her hands, and ascertains if there is a defect in the container. It can be ascertained that manual inspection of glass containers is time-consuming, and results in a relatively small number of containers being subject to inspection.

To address deficiencies associated with manual inspection, automated inspections systems that automatically identify defects in sidewalls of glass containers have been developed. These automated inspection systems include a computing system, a plurality of cameras arranged symmetrically about an inspection region, and backlights, wherein containers pass through the inspection region as such containers are transported by a conveyor. When a container reaches the inspection region, the backlights illuminate the inspection region and the plurality of cameras are configured to generate images of the sidewall of the container while the inspection region is illuminated. The computing system receives the images and, through use of image analysis technologies, determines whether the sidewall of the container includes a defect based upon the images.

While automated container inspection systems offer improvements over the conventional manual inspection process, there are nevertheless deficiencies associated with such automated container inspection systems. Specifically, locations of cameras that can be arranged about inspection regions are limited due to the conveyor; that is, cameras can be positioned alongside the conveyor, but cannot be positioned to acquire an "along the conveyor" image of the container. Thus, conventional automated container inspection systems have difficulty with detecting defects in sidewalls of transparent containers when such defects are at certain positions relative to the conveyor.

Additionally, a number of cameras that can be included in a container inspection system is limited by the backlights referenced above. Each camera has a backlight corresponding thereto, wherein the backlight is positioned on an opposite side of the conveyor as the respective camera. The backlights tend to be somewhat large, as the backlights need to emit a sufficient amount of light to illuminate an entirety of the container from the perspective of the corresponding camera. Hence, since a backlight cannot be positioned along the conveyor (as the backlight would impede movement of containers along the conveyor), a camera cannot be positioned along the conveyor. Further, due to the size of the backlights, a camera cannot be positioned both 1) proximate the conveyor; and 2) at an angle relative to the conveyor to capture an image of a "front" of a container as the container is transported along the conveyor, as the backlight would impede the containers along the conveyor.

SUMMARY

The following is a brief summary of subject matter that is described in greater detail herein. This summary is not intended to be limiting as to the scope of the claims.

Described herein are various technologies pertaining to sequential imaging for container sidewall inspection. With more specificity, described herein is a container inspection system comprising a camera configured to capture several images of a container as the container is at different positions relative to the camera due to the container being transported on a conveyer. The camera is in communication with a computing system that receives the images and determines whether the container includes a defect based upon the images. With still more specificity, the computing system is configured to identify that the container is at a first location relative to the camera as the container is transported on the conveyer. The computing system is additionally configured to transmit a first signal to the camera in response to identifying that the container is at the first location, wherein the first signal causes the camera to capture a first image of the container when the container is at the first location. The computing system is further configured to identify when the container is at a second location relative to the camera as the container is transported on the conveyer. The computing system is also configured to transmit a second signal to the camera in response to identifying that the container is at the second location, wherein the second signal causes the camera to capture a second image of the container when the container is at the second location. The computing system receives the first image and the second image and is configured to detect a defect in the container based on at least one of the first image or the second image.

More generally, the container inspection system includes several cameras, where each of the cameras is configured to capture multiple images of the container when the container is at different locations relative to the cameras (as the container is transitioning through a container inspection area on a conveyor). This is in contrast to the conventional approach; in the conventional approach, each camera captures a single image of the container when the container is at centers of the fields of view of the cameras. In an exemplary embodiment, a camera can be configured to capture a first image of the container as the container initially enters a field of view of the camera, can be configured to capture a second image of the container as the container is at the center of the field of view of the camera, and can be configured to capture a third image of the container as the container is exiting the field of view of the camera. By capturing the three images when the container is at different positions relative to the camera, the three images can depict different portions of the sidewall of the container (and thus the different portions captured in the three images can be analyzed to ascertain whether the sidewall includes a defect). The computing system analyzes each of the images output by each of the cameras of the camera inspection system and determines whether a container includes a defect in the sidewall thereof based upon at least one of the images output by the cameras.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to sequential imaging for container sidewall inspection are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

Figure 1:
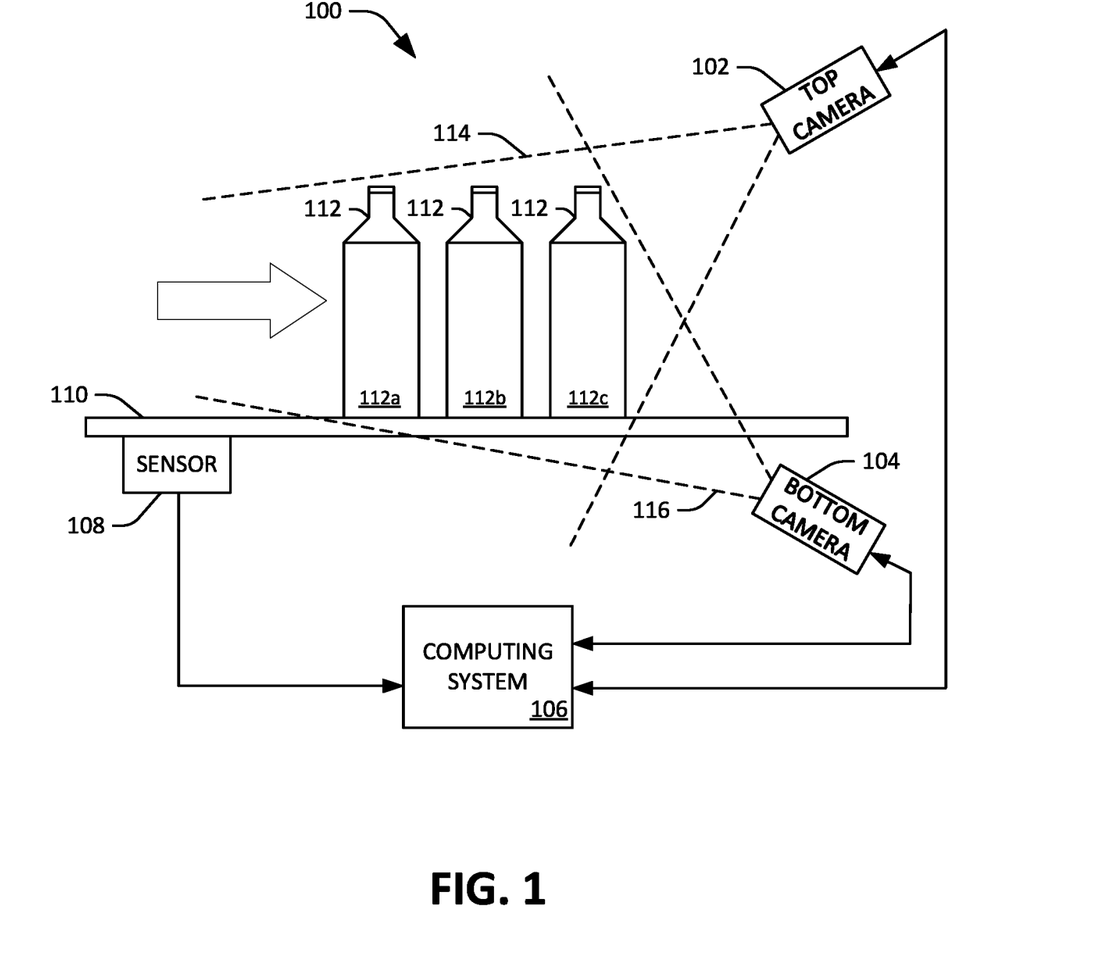
FIG. 1 illustrates an exemplary system for inspecting a sidewall of a transparent container for defects.

With reference now to FIG. 1, an exemplary container inspection system 100 for inspecting a sidewall of a container is illustrated. The container inspection system 100 comprises a top camera 102 and a bottom camera 104, wherein the top camera 102 is vertically offset from the bottom camera 104 along a vertical plane. In an example, the top camera 102 can be pointed downwardly and the bottom camera 104 can be pointed upwardly, as illustrated in FIG. 1. The container inspection system 100 additionally includes a computing system 106 that is in communication with the cameras 102 and 104, wherein the computing system 106 is configured to output signals that cause the cameras 102 and 104 to capture images. The container inspection system 100 further comprises a sensor 108, wherein the computing system 106 receives sensor signals output by the sensor 108. As will be described in greater detail below, the sensor signals output by the sensor 108 are indicative of locations of containers relative to locations of the cameras 102 and 104. While not illustrated in FIG. 1, the container inspection system 100 further comprises a backlight that faces the cameras 102 and 104, such that light emitted by the backlight is directed towards lenses of the cameras 102 and 104, and an object (e.g., a transparent or semi-transparent container) that is positioned between the backlight and the cameras 102 and 104 is illuminated by light emitted from the backlight. Further, the cameras 102 and 104 are positioned on a first side of a conveyor 110 while the backlight is positioned on a second side of the conveyor 110, such that containers that are transported on the conveyor 102 pass between the cameras 102 and 104 and the backlight. The backlight is in communication with the computing system 106, and the computing system 106 transmits control signals to the backlight such that the backlight emits light when the cameras 102 and 104 capture images (e.g., when a container is on the conveyor 110 between the cameras 102 and 104 and the backlight).

Exemplary operation of the container inspection system 100 is now set forth. A container 112 is transported along the conveyor 110, wherein the container 112 is transparent or semi-transparent. Thus, the container 112 can be a glass container, a plastic container, etc. The sensor 108 outputs sensor signals that are indicative of locations of the container 112 relative to the cameras 102-104 over time. For example, the sensor 108 can be an encoder, wherein output of the encoder is indicative of a location of the container 112 as the container 112 is transported on the conveyor 110.

The computing system 106 receives the sensor signals output by the sensor 108 and causes each of the cameras 102-104 to capture multiple images of the container 112 based upon the sensor signals. For example, the computing system 106, based upon a first sensor signal output by the sensor 108, can ascertain that the container 112 is at a first location 112*a* relative to the cameras 102-104 (e.g., the container 112 has just entered fields of view 114 and 116 of the respective cameras 102-104). Upon determining that the container 112 is at the first location 112*a* relative to the cameras 102-104, the computing system 106 transmits first control signals to the cameras 102-104. The cameras 102-104, upon receiving the first control signals, capture first images when the container 112 is at the first location 112*a* relative to the cameras 102-104. Subsequently, the computing system 106, based upon a second sensor signal output by the sensor 108, can ascertain that the container 112 is at a second location 112*b* relative to the cameras 102-104 (e.g., the container 112 is at the centers of the fields of view 114 and 116 of the respective cameras 102-104). Upon determining that the container 112 is at the second location 112*b* relative to the cameras 102-104, the computing system 106 transmits second control signals to the cameras 102-104.

The cameras 102-104, upon receiving the second control signals, capture second images when the container 112 is at the second location 112b relative to the cameras 102-104. Later, after the conveyor 110 has further moved the container 112 in the direction of the arrow depicted in FIG. 1, the computing system 106, based upon a third sensor signal output by the sensor 108, can ascertain that the container 112 is at a third location 112c relative to the cameras 102-104 (e.g., the container 112 is exiting the fields of view 114 and 116 of the respective cameras 102-104). Upon determining that the container 112 is at the third location 112c relative to the cameras 102-104, the computing system 106 transmits third control signals to the cameras 102-104. The cameras 102-104, upon receiving the third control signals, capture third images when the container 112 is at the third location 112c relative to the cameras 102-104.

The computing system 106 receives the first, second, and third images captured by the cameras 102-104, and determines whether the container 112 includes a defect based upon at least one of such images. When the computing system 106 detects a defect in the container 112 based upon at least one of the images captured by the cameras 102-104, the computing system 106 can cause the container 112 to be removed from the conveyor 110.

The system 100 exhibits various advantages over conventional systems for detecting defects in transparent containers. By causing the cameras 102-104 to capture images of the container 112 when the container is at different positions relative to the cameras 102-104, images of the container 112 can be captured from several different perspectives (while the cameras 102-104 remain stationary). Hence, in an example, the computing system 106 can detect a defect in the container 112 based upon the defect being detectable in a first image of the container 112 captured by the bottom camera 104, even though the defect is not detectable by the computing system 106 in a second image of the container 112 captured by the bottom camera 104 (e.g., the defect may be obscured in a shadow in the second image but not the first image).

Further, the computing system 106 can disambiguate between defects and purposeful designs imprinted on the sidewall of the container 112 based upon multiple images of the container 112 captured by a single camera as the container 112 moves along the conveyor 110. For example, the computing system 106, based upon a first image captured by the bottom camera 104, can determine that the container 112 includes a defect. The computing system 106 can receive second and third images and can determine that the container 112 fails to include the defect based upon the second and third images. For instance, the computing system 106 can spatially align the container 112 across the first, second, and third images and can ascertain that the region on the sidewall of the container 112 where the computing system identified the defect based upon the first image actually includes a raised design (as indicated based upon processing of the second and third images). The computing system 106 can employ any suitable approach for identifying defects, including comparing an image of a transparent container with a statistical model of a transparent container that is free of defects, comparing regions of the transparent container in an image with a signature for a particular type of defect (e.g., check, stone, bubble, crack), etc.

Figure 2:
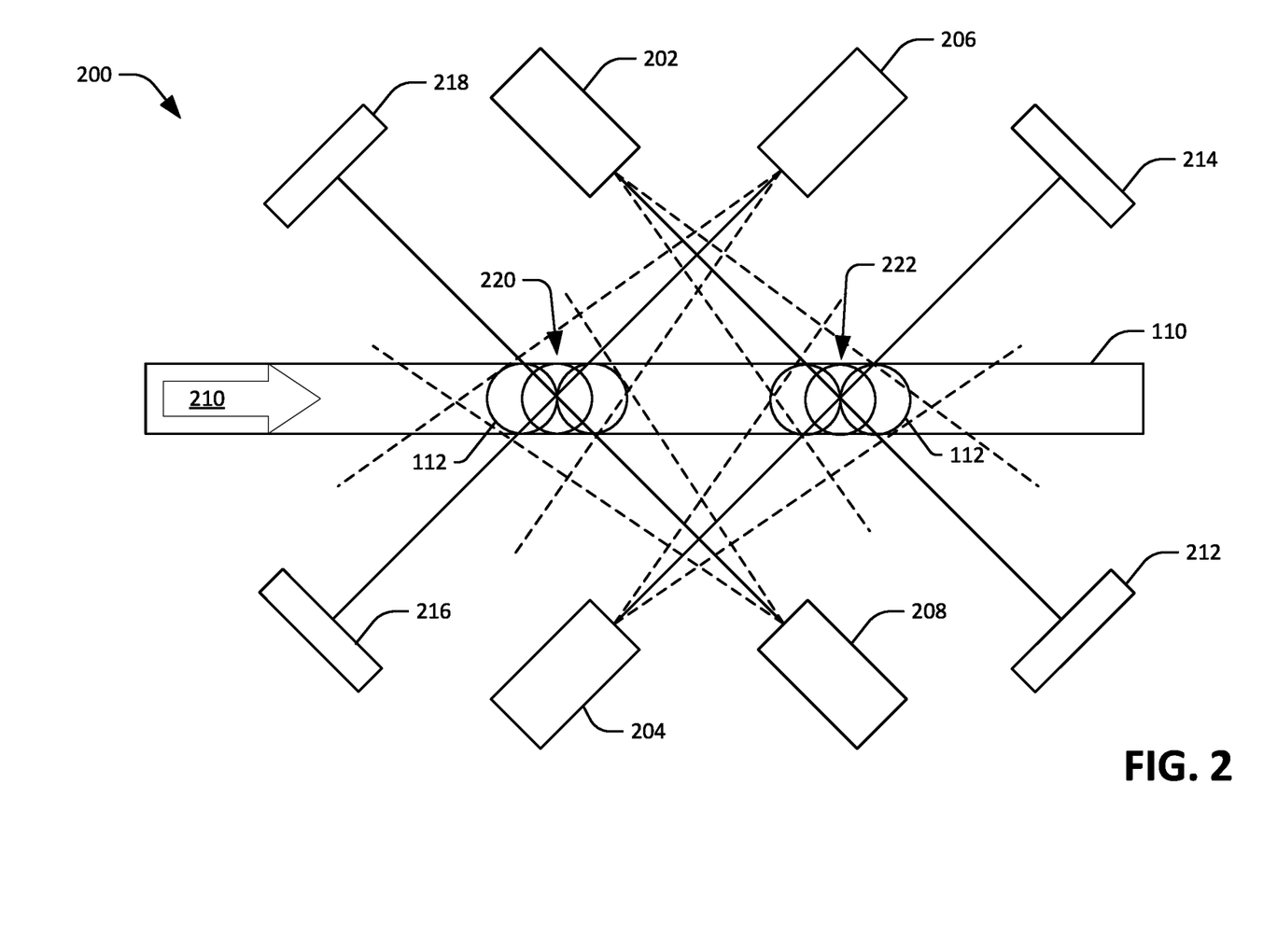
FIG. 2 illustrates an overhead view of exemplary system for inspecting a container for defects based on sequential imaging.

With reference now to FIG. 2, an overhead view of an exemplary system 200 for inspecting a sidewall of the container 112 is presented. The system 200 comprises a plurality of cameras 202-208 that are positioned relative to the conveyor 110 to capture images of transparent containers that are being transported by the conveyor 110. While the system 200 is illustrated as including four cameras 202-208, it is to be understood that the system 200 may include additional cameras. For instance, the system 200 can include eight cameras (four sets of vertically stacked cameras, as illustrated in FIG. 1). The cameras 206 and 208 are positioned relative to the conveyor 110 to capture "front" sides of containers as the containers are being transported towards the cameras 206 and 208 by the conveyor 110 (e.g., the conveyor 110 transports the containers in the direction of the arrow 210). The cameras 202 and 204 are positioned relative to the conveyor 110 to capture "back" sides of containers as the containers are being transported away from the cameras 202-204 by the conveyor 110. The fields of view for the plurality of cameras (102-105; 202-208) may overlap to define a central inspection area within which images of the container 110 may be captured by all the plurality of cameras (102-105; 202-208) at the first location 110(a), the second location 110(b), and the third location 110(c) as the container 110 is transported on the conveyer 112.

The system 200 further includes a plurality of backlights 212-218 that respectively correspond to the cameras 202-208. More specifically, the backlight 212 is configured to illuminate containers when the camera 202 captures images of the containers, the backlight 214 is configured to illuminate containers when the camera 204 captures images of the containers, the backlight 216 is configured to illuminate containers when the camera 206 captures images of the containers, and the backlight 218 is configured to illuminate containers when the camera 208 captures images of the containers.

The cameras 202-208 and the backlights 212-218 are arranged symmetrically about the conveyor 110, such that centers of fields of view of the cameras 206 and 208 intersect at approximately a center of the conveyor 110 along a width of the conveyor 110 at a first position 220 along a length of the conveyor 110, and centers of fields of view of the cameras 202 and 204 intersect at approximately the center of the conveyor 110 at a second position 222 along the length of the conveyor 110. While not shown, the system 200 additionally includes the sensor 108 and the computing system 106, wherein the computing system 106 is operably coupled to the sensor 108, the cameras 202-208, and the backlights 212-218.

Exemplary operation of the system 200 is now described. The container 112 is transported on the conveyor 110 in the direction of the arrow 210. At a first point in time, the computing system 106 receives a first sensor signal output by the sensor 108 that indicates that the container 112 is at a first location on the conveyor 110 (e.g., where the container 112 is within the fields of view of the cameras 206 and 208, but a center of the container 112 has not yet reached the first position 220). The computing system 106, based upon the first sensor signal, transmits first control signals to the cameras 206 and 208 and the corresponding backlights 216 and 218, wherein the first control signals cause the backlights 216 and 218 to illuminate the container 112 and further cause the cameras 206 and 208 to capture first images of the container 112 while the container 112 is illuminated by the backlights 216 and 218. At a second point in time that is subsequent the first point in time, the computing system 106 receives a second sensor signal output by the sensor 108 that indicates that the container 112 is at a second location on the conveyor 110 (e.g., where a center of the container 112 is approximately at the first position 220, and thus at centers of the fields of view of the cameras 206 and 208). The computing system 106, based upon the second sensor signal, transmits second control signals to the cameras 206 and 208 and the corresponding backlights 216 and 218, wherein the second control signals cause the backlights 216 and 218 to illuminate the container 112 and further cause the cameras 206 and 208 to capture second images of the container 112 while the container 112 is illuminated by the backlights 216 and 218.

At a third point in time that is subsequent the second point in time, the computing system 106 receives a third sensor signal output by the sensor 108 that indicates that the container 112 is at a third location on the conveyor 110 (e.g., where the container 112 is within the fields of view of the cameras 206 and 208, but the center of the container 112 has passed the first position 220). The computing system 106, based upon the third sensor signal, transmits third control signals to the cameras 206 and 208 and the corresponding backlights 216 and 218, wherein the third control signals cause the backlights 216 and 218 to illuminate the container 112 and further cause the cameras 206 and 208 to capture third images of the container 112 while the container 112 is illuminated by the backlights 216 and 218. Thus, each of the cameras 206 and 208 capture several images of the container 112 as the container 112 is moved along the conveyor 110.

The conveyor 110 thereafter transports the container 112 further in the direction depicted by the arrow 210. At a fourth point in time that is subsequent the third point in time, the computing system 106 receives a fourth sensor signal output by the sensor 108 that indicates that the container 112 is at a fourth location on the conveyor 110 (e.g., where the container 112 is within the fields of view of the cameras 202 and 204, but a center of the container 112 has not yet reached the second position 222). The computing system 106, based upon the fourth sensor signal, transmits fourth control signals to the cameras 202 and 204 and the corresponding backlights 212 and 214, wherein the fourth control signals cause the backlights 212 and 214 to illuminate the container 112 and further cause the cameras 202 and 204 to capture fourth images of the container 112 while the container 112 is illuminated by the backlights 212 and 214. For sake of brevity, additional explanation as to operation of the system 200 is not provided; it is to be understood that the cameras 202 and 204 each capture multiple images of the container 112 at different (predefined) locations as the container 112 is transported by the conveyor 110.

Figure 3:
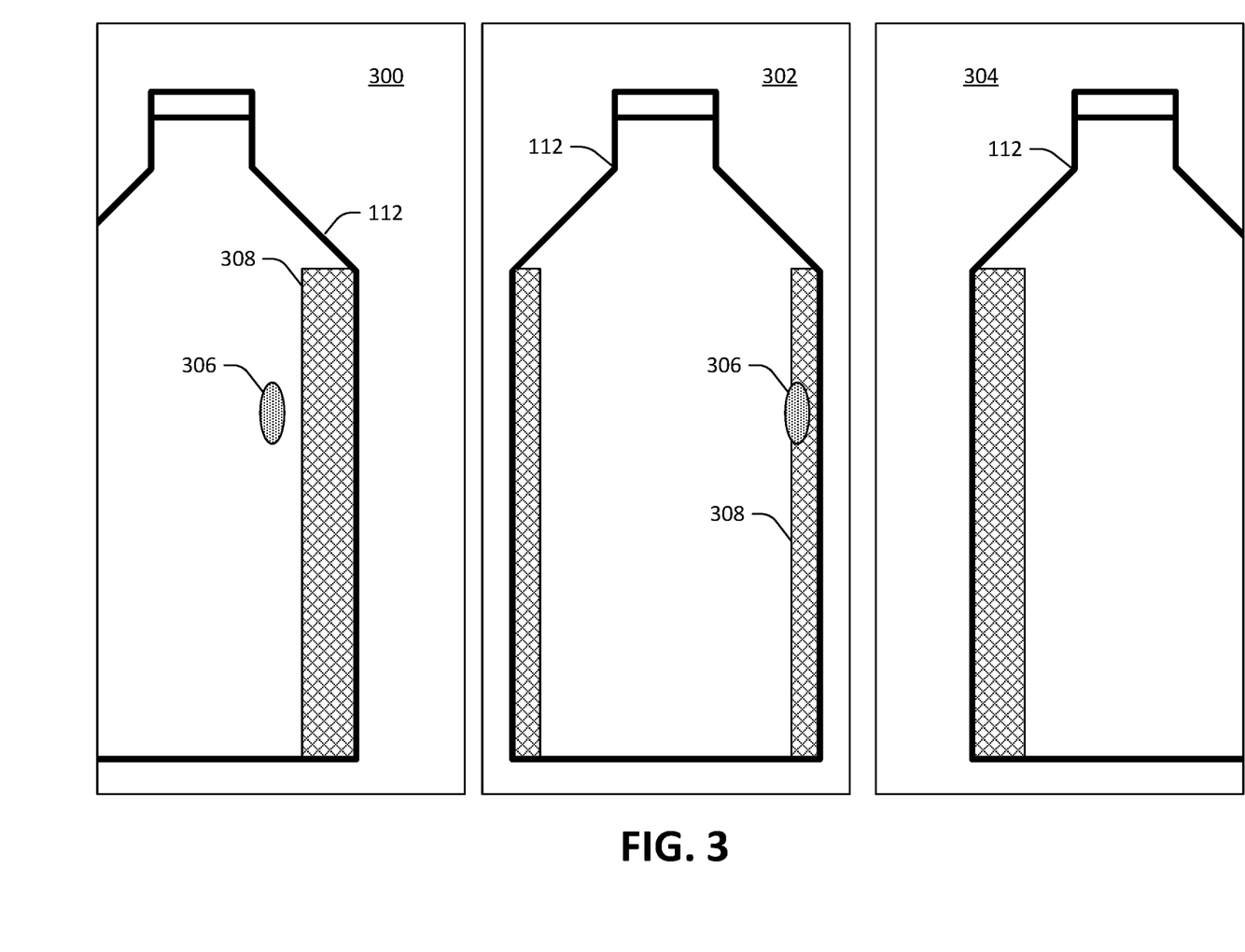
FIG. 3 illustrates exemplary perspectives on a defect in a container as the container is transported on a conveyer.

With reference now to FIG. 3, several images 300-304 of the container 112 captured by, for example, the camera 206 are illustrated. The first image 300 is captured by the camera 206 just prior to the center of the container 112 reaching the first position 220, the second image 302 is captured by the camera 206 when the center of the container 112 is at the first position 220, and the third image 304 is captured by the camera 206 when the center of the container 112 has passed the first position 220. In an example, the container 112 can include a defect 306 (e.g., a stone). In the first image 300, the defect 306 is not obscured by a shadow 308 (corresponding to a sidewall of the container 112), and thus the computing system 106 can identify the defect 306 in the container 112 based upon the first image 300. The defect 306 is visible in the first image 300 due to a position of the container 112 relative to the camera 206 when the camera 208 captured the first image 300.

In the second image 302, however, the defect 306 is partially obscured by the shadow 308, such that the computing system 106 is unable to ascertain that the container 112 includes the defect 306 based solely upon the second image 302. The defect 306 is obscured in the second image 302 due to a position of the container 112 relative to the camera 206 when the camera 206 captured the second image. In the third image 304, the defect 306 is not included due to the "front" of the container 112 being outside of the field of view of the camera 206 when the camera 206 captured the third image 304. Since the camera 206 captured the several images 300-304 of the container 112 when the container 112 was at various different positions relative to the camera 208, however, the computing system 106 can determine that the container 112 includes the defect 306 (e.g., based upon the first image 300). In contrast, using conventional approaches, only the second image 302 would be captured by the camera 206 (when the container 112 is in the center of the field of view of the camera 206), and the computing system 106 may be unable to detect the defect 306.

Figure 4:
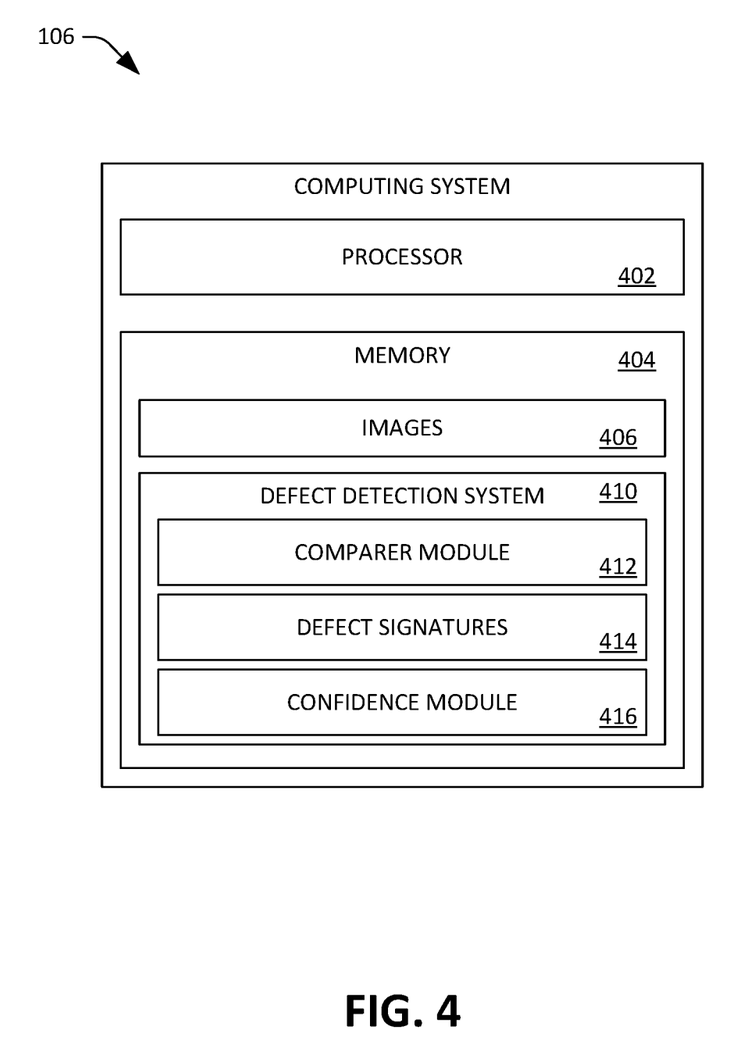
FIG. 4 is a functional block diagram of an exemplary computing system.

With reference now to FIG. 4, a functional block diagram of the computing system 106 is illustrated. The computing system 106 includes a processor 402 and memory 404 that stores instructions that, when executed by the processor 402, cause the processor 402 to perform a plurality of acts. The memory 404 has images 406 loaded therein. For instance, the images 406 can comprise several images of the container 112 captured by a camera (e.g., the camera 208) when the container 112 is at different positions on the conveyor 110 relative to the camera.

The memory 404 additionally comprises a defect detection system 410 loaded therein. The defect detection system 410 is generally configured to determine whether the sidewall of the container has a defect based upon the images 406. The defect detection system 410 can be configured to identify both transparent and opaque defects in sidewalls of transparent containers.

The defect detection application 410 includes a comparer module 412 that is configured to employ defect signatures 414 to detect defects in containers based upon images of such containers. The signatures 414 can be image signatures that are representative of defects that may exist in a transparent container; for example, a defect may typically be of a certain size in an image, may be associated with a particular gradient in the image, may have a certain color shade, and so forth. A signature for the defect can represent such defect attributes. The comparer module 412 is configured to receive an image from the images 406 and search the images for values that correspond to the defect signatures 414. Put differently, the comparer module 412 is configured to compare the defect signatures 414 with features of each image in the images 406 to ascertain whether one or more of the images 406 captures a defect in the container 112.

A confidence module 416 can additionally be included in the defect detection application 410 to provide a basis for determining that the container 112 captured in the images 406 includes a defect. For instance, the confidence module 416 can compute a confidence score for each defect identified by the comparer module 412. As noted previously, a first image of the container may illustrate a defect, and the confidence module 416 (based upon the first image) can output a first confidence score that indicates that the confidence module is highly confident that the container includes a defect. In contrast, in the second image of the container, the defect may be partially obscured in a shadow; thus, the confidence module 416 can output a second confidence score for the defect that is lower than the first confidence score. Due to one of the confidence scores being above a threshold, the defect detection system 410 can output an indication that the container has a defect.

Figure 5:
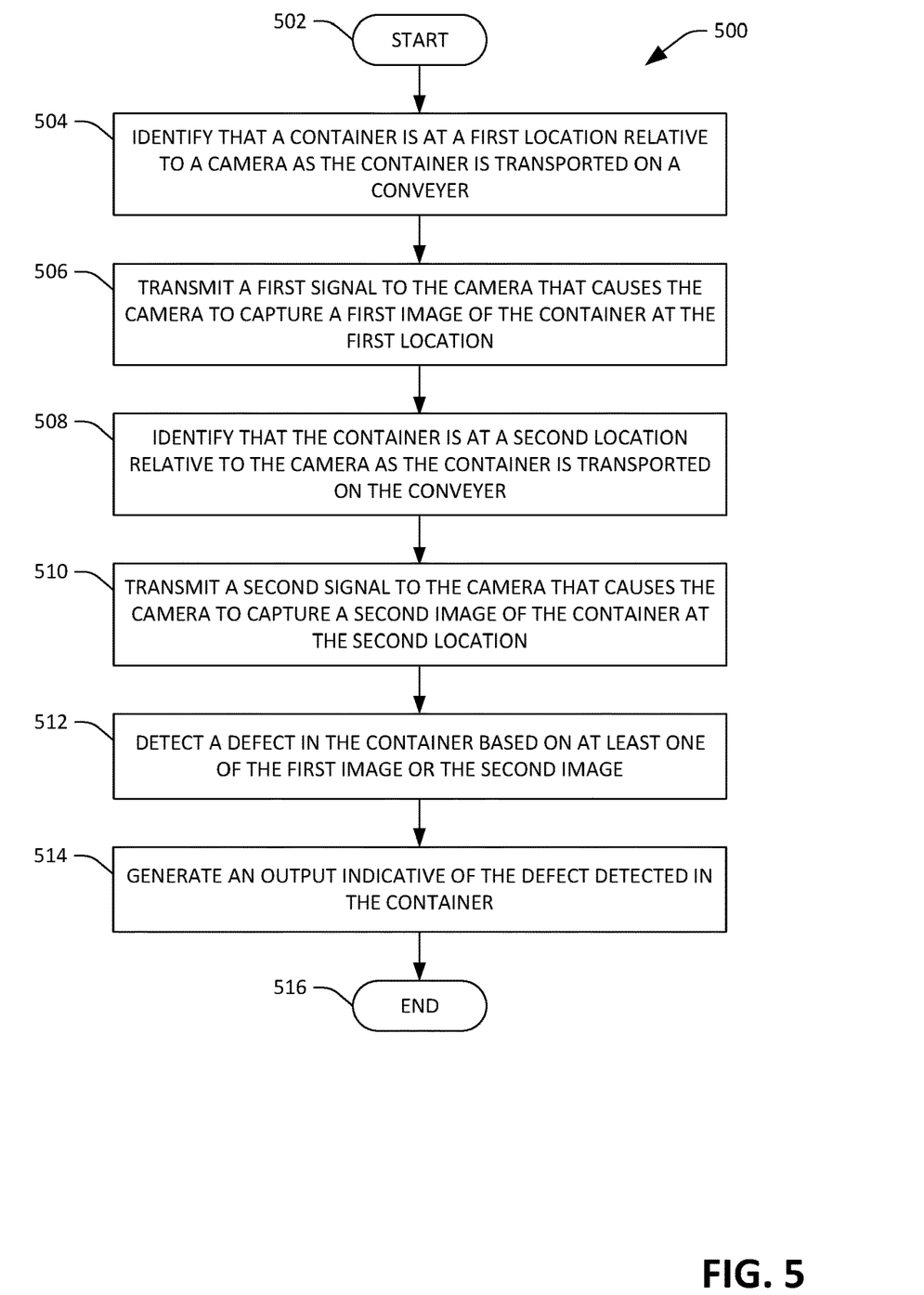
FIG. 5 is a flow diagram illustrating an exemplary methodology for inspecting a container for a defect.
Figure 6:
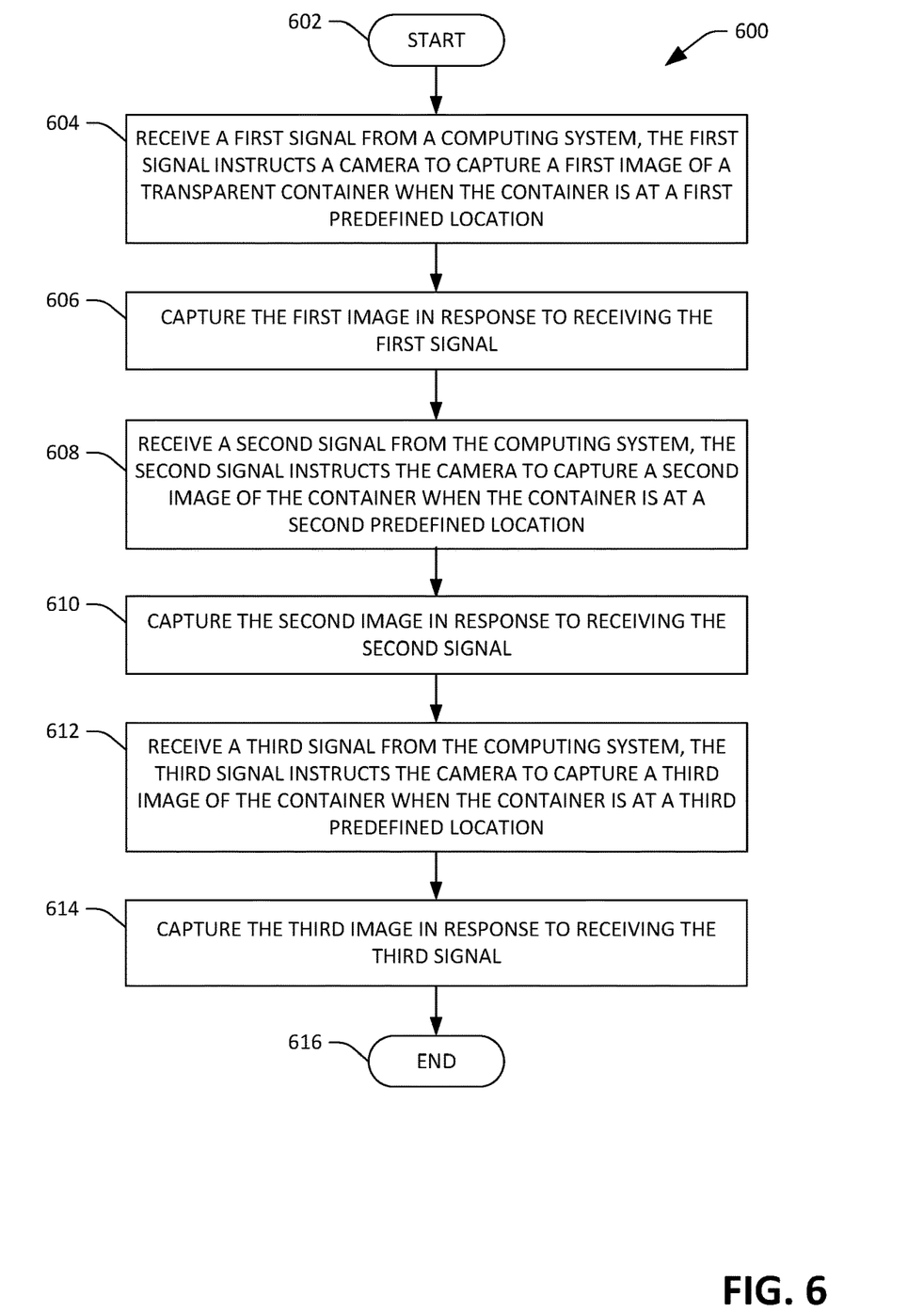
FIG. 6 is a flow diagram illustrating an exemplary methodology capturing multiple images of a transparent container as the transparent container is transported on a conveyor.

FIGS. 5-6 illustrate exemplary methodologies relating to inspecting sidewalls of transparent containers for defects.

While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for inspecting a container for a defect is illustrated. The methodology 500 starts at 502, and at 504 an identification is made that a container, being transported on a conveyor, is at a first (predefined) location relative to a camera. For example, a sensor can output a sensor signal that indicates that the container has entered a field of view of the camera but has yet to reach the center of the field of view of the camera. At 506, in response to identifying that the container is at the first location, a first signal is transmitted to the camera that causes the camera to capture a first image of the container when the container is at the first location.

At 508, as the container has been moved further by the conveyor, an identification is made that the container is at a second (predefined) location relative to the camera. For example, the sensor can output a second sensor signal that indicates that a center of the container is approximately at a center of the field of view of the camera. At 510, in response to identifying that the container is at the second location, a second signal is transmitted to the camera that causes the camera to capture a second image of the container when the container is at the second location.

At 512, based on at least one of the images (e.g., at least one of the first image or the second image), a defect in the container is detected. The defect may be a crack, a stone, a check, or other suitable defect that is found in transparent (glass) containers. At 514, an output is generated that is indicative of the defect detected in the container. For example, the output can cause the container to be removed from the conveyor, such that the container is not filled with liquid. The methodology 500 completes at 516.

Referring now to FIG. 6, an exemplary methodology 600 performed by a camera of a transparent container inspection system is illustrated. The methodology 600 starts at 602, and at 604 the camera receives a first signal from a computing system, wherein the first signal instructs the camera to capture a first image of a transparent container when the transparent container is at a first predefined location relative to the camera. At 606, in response to receiving the first signal, the camera captures the first image of the container. In an example, the container can be off-center in the first image. Put differently, the container may have entered the field of view but may have not reached the center of the field of view of the camera when the first image is captured.

At 608, the camera receives a second signal from the computing system, wherein the second signal instructs the camera to capture a second image of the transparent container when the transparent container is at a second predefined location relative to the camera. At 610, in response to receiving the second signal, the camera captures the second image of the container. In an example, the container can be centered in the second image.

At 612, the camera receives a third signal from the computing system, wherein the third signal instructs the camera to capture a third image of the transparent container when the transparent container is at a third predefined location relative to the camera. At 614, in response to receiving the third signal, the camera captures the third image of the container. In an example, the container can be off-center in the third image. In other words, the container may have past the center of the field of view of the camera when the camera captures the third image. The computing system can detect a defect based upon at least one of the first image, the second image, or the third image. The methodology 600 completes at 616.

Figure 7:
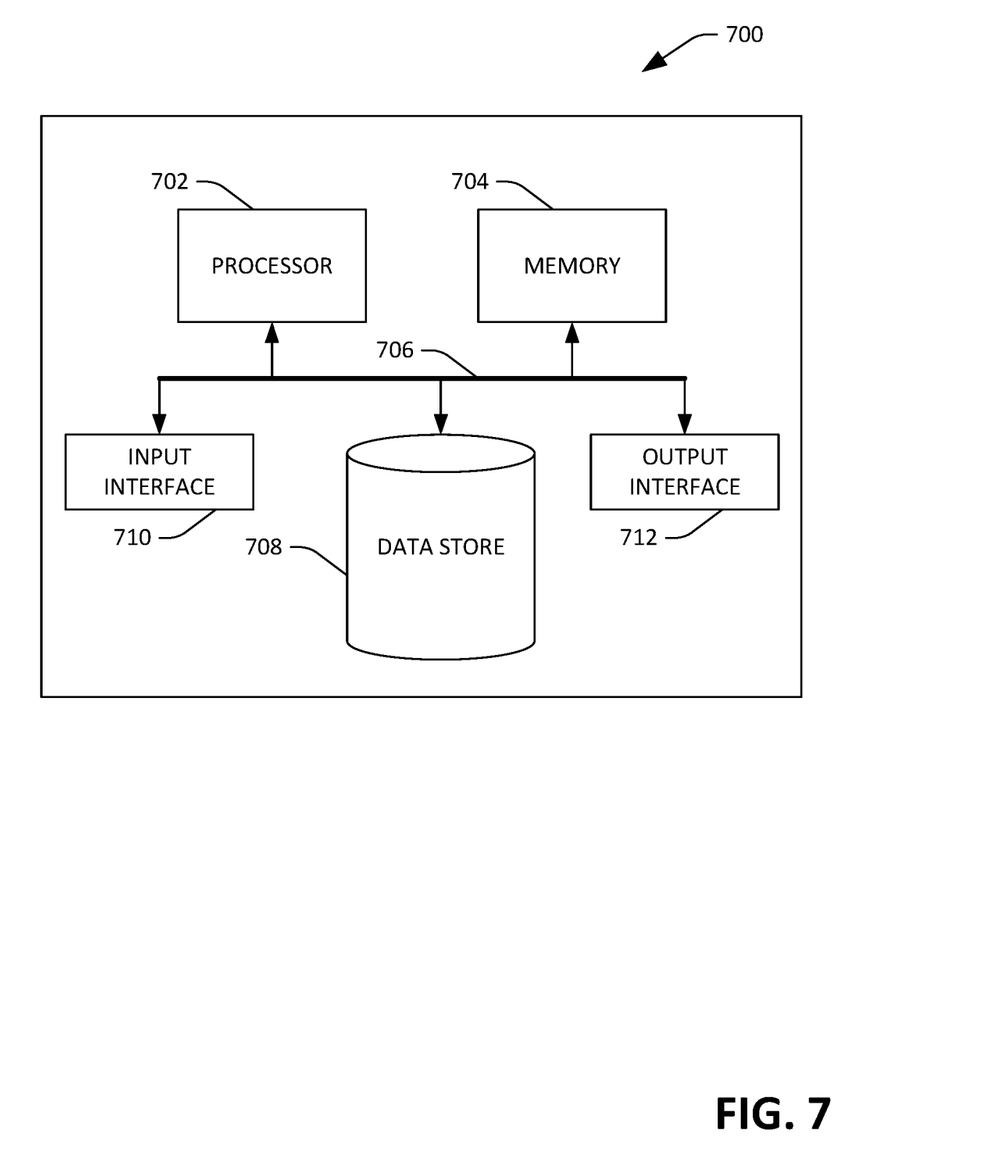
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 106. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store images, defect signatures, and the like.

The computing device 700 additionally includes a data store 708 that is accessible by the processor 702 by way of the system bus 706. The data store 708 may include executable instructions, images, defect signatures, and the like. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may transmit control signals to one or more of the cameras (202-208), one or more of the backlights (212-218), the conveyer 110, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A container inspection system, comprising:
a camera configured to capture images of a container; and
a computing system in communication with the camera, wherein the computing system comprises:
a processor; and
memory that stores instructions that, when executed by the processor, cause the processor to perform acts comprising:
prior to the container reaching a center of a field of view of the camera as the container is transported on a conveyor, identifying that the container is at a first predefined location relative to the camera;
transmitting a first signal to the camera in response to identifying that the container is at the first predefined location, wherein the first signal causes the camera to capture a first image of the container when the container is at the first predefined location and as the container is being transported on the conveyor towards the camera, and further wherein the container is at a first off-center location within the field of view of the camera when the camera captures the first image of the container;
subsequent to the container passing a center of the field of view of the camera as the container is transported on the container, identifying that the container is at a second predefined location relative to the camera;
transmitting a second signal to the camera in response to identifying that the container is at the second predefined location and as the container is being transported on the conveyor towards the camera, wherein the second signal causes the camera to capture a second image of the container when the container is at the second predefined location, and further wherein the container is at a second off-center location within the field of view of the camera when the camera captures the second image of the container;
detecting a defect in the container based on at least one of the first image or the second image; and
generating an output that indicates that the container is defective in response to detecting the defect in the container.

2. The container inspection system of claim 1 further comprising a sensor, wherein the computing system identifies that the container is at the first predefined location based on a first output by the sensor, and wherein the computing system identifies that the container is at the second predefined location based on a second output by the sensor.

3. The container inspection system of claim 1, wherein the container is a glass container.

4. The container inspection system of claim 1, the acts further comprising:
subsequent to identifying that the container is at the first predefined location and prior to identifying that the container is at the second predefined location, and when the container is at a center of the field of view of the camera, identifying that the container is at a third predefined location relative to the camera as the container is transported on the conveyer; and
transmitting a third signal to the camera in response to identifying that the container is at the third predefined location, wherein the third signal causes the camera to capture a third image of the container when the container is at the third predefined location and as the container is being transported on the conveyor towards the camera, wherein the first image is captured prior to the second image, wherein the second image is captured subsequent to the third image, and further wherein the container is centered in the field of view of the camera when the third image is captured.

5. The container inspection system of claim 1, further comprising a second camera in communication with the computing system, wherein the second camera captures a third image of the container when the container is at the first predefined location and a fourth image of the container when the container is at the second predefined location, and further wherein the container is off-center in a field of view of the second camera when the camera captures both the third image and the fourth image.

6. The container inspection system of claim 5, wherein the second camera is vertically offset from the first camera along a vertical plane.

7. The container inspection system of claim 1, wherein the defect is one of a check, a blister, a seed, or a stone.

8. The container inspection system of claim 1, further comprising a backlight, wherein the camera is positioned on a first side of the conveyor and the backlight is positioned on a second side of the conveyor that is opposite the first side of the conveyor, the acts further comprising:

transmitting a first control signal to the backlight in response to identifying that the container is at the first predefined location, wherein the backlight illuminates the container in response to receiving the first control signal; and transmitting a second control signal to the backlight in response to identifying that the container is at the second predefined location, wherein the backlight illuminates the container in response to receiving the second control signal.

9. The container inspection system of claim 1, wherein the camera is fixed such that the camera is stationary.

10. The container inspection system of claim 1, further comprising a second camera, a third camera, and a fourth camera, wherein the camera, the second camera, the third camera, and the fourth camera are symmetrically arranged about the conveyor.

11. A method performed by a container inspection system for inspecting a container for a defect, the method comprising:

prior to the container reaching a center of a field of view of a container as the container is transported by a conveyor, identifying that the container is at a first predefined location relative to the camera;

transmitting a first signal to the camera in response to identifying that the container is at the first predefined location, wherein the first signal causes the camera to capture a first image of the container when the container is at the first predefined location and as the container is being transported on the conveyor towards the camera and as the container is being transported on the conveyor towards the camera and as the container is being transported on the conveyor towards the camera, wherein there is a direct line of sight between the camera and the container when the camera captures the first image of the container, and further wherein the container is at a first off-center location within a field of view of the camera when the camera captures the first image of the container;

subsequent to the container passing the center of the field of view of the container as the container is transported by the conveyor, identifying that the container is at a second predefined location relative to the camera;

transmitting a second signal to the camera in response to identifying that the container is at the second predefined location, wherein the second signal causes the camera to capture a second image of the container when the container is at the second predefined location and as the container is being transported on the conveyor towards the camera, wherein the second image captures the portion of the container, wherein there is a direct line of sight between the camera and the container when the camera captures the second image of the container, and further wherein the container is centered in the field of view of the camera when the camera captures the second image of the container;

detecting a defect in the container based on at least one of the first image or the second image; and causing the container to be removed from the conveyor due to the container having the defect.

12. The method of claim 11, wherein the container is a transparent container.

13. The method of claim 11, further comprising:

identifying that the container is at a third predefined location relative to the camera as the container is transported on the conveyer; and transmitting a third signal to the camera in response to identifying that the container is at the third predefined location, wherein the third signal causes the camera to capture a third image of the container when the container is at the third predefined location and as the container is being transported on the conveyor towards the camera, wherein the third image captures the portion of the container, wherein there is a direct line of sight between the camera and the container when the camera captures the third image of the container, wherein the first image is captured prior to the second image, the second image is captured prior to the third image, and further wherein the container is off-center in the field of view of the camera when the third image is captured.

14. The method of claim 11, further comprising:

transmitting a third signal to a second camera in response to identifying that the container is at the first predefined location, wherein the third signal causes the second camera to capture a third image of the container when the container is at the first predefined location; and transmitting a fourth signal to the second camera in response to identifying that the container is at the second predefined location, wherein the fourth signal causes the second camera to capture a fourth image of the container when the container is at the second predefined location, and further wherein the camera has a direct line of sight to the container when the third image and the fourth image were captured.

15. The method of claim 11, wherein the camera is one of a plurality of cameras that capture images of the container, wherein the plurality of cameras includes four top cameras having downwardly directed fields of view and four bottom cameras having upwardly directed fields of view.

16. The method of claim 15, wherein the plurality of cameras are arranged symmetrically about the conveyor.

17. The method of claim 11, further comprising:

transmitting a first control signal to a backlight in response to identifying that the container is at the first predefined location, wherein the backlight illuminates the container in response to receiving the first control signal; and transmitting a second control signal to the backlight in response to identifying that the container is at the second predefined location, wherein the backlight illuminates the container in response to receiving the second control signal.

18. A container inspection system that comprises a non-transitory computer-readable storage medium, wherein the non-transitory computer-readable storage medium comprises instructions that, when executed by a processor, cause the processor to perform acts comprising:

receiving a first sensor signal from a sensor, wherein the first sensor signal indicates that a transparent container being transported on a conveyor is at a first predefined location relative to a camera;

in response to receiving the first sensor signal, transmitting a first signal to the camera, wherein the first signal is configured to cause the camera to capture a first image of the transparent container when the transparent container is at the first predefined location relative to the camera and as the container is being transported on the conveyor towards the camera, wherein there is a direct line of sight between the camera and the container when the camera captures the first image, and further wherein the container is off-center in a field of view of the camera and entering the field of view of the camera when the camera captures the first image;

receiving, from the camera, the first image of the transparent container upon the camera capturing the first image of the transparent container;

receiving a second sensor signal from the sensor, wherein the second sensor signal indicates that the transparent container being transported on the conveyor is at a second predefined location relative to the camera;

in response to receiving the second sensor signal, transmitting a second signal to the camera, wherein the second signal is configured to cause the camera to capture a second image of the transparent container when the transparent container is at the second predefined location relative to the camera and as the container is being transported on the conveyor towards the camera, and further wherein there is a direct line of sight between the camera and the container when the camera captures the second image;

receiving, from the camera, the second image of the transparent container upon the camera capturing the second image of the transparent container, wherein the container is off-center in the field of view of the camera and exiting the field of view of the camera when the camera captures the second image;

detecting a defect in the transparent container based upon at least one of the first image or the second image; and generating an output that indicates that the container includes the defect.

19. The container inspection system of claim 18, wherein the defect is one of a seed, a check, a blister, or a stone.

20. The container inspection system of claim 18, wherein the defect in the transparent container is detected based upon only one of the first image or the second image.

* * * * *